United States Patent [19]

Fujiwara et al.

[11] 4,326,666
[45] Apr. 27, 1982

[54] CENTRIFUGAL TYPE COUNTERFLOW CONTACT APPARATUS

[75] Inventors: Kiyoshi Fujiwara; Katsuaki Nagatomo; Shoji Yoshinaga; Zensuke Tamura; Fumio Shibata; Hiroshi Kanekiyo, all of Kudamatsu, Japan

[73] Assignee: Hitachi, Ltd., Tokyo, Japan

[21] Appl. No.: 37,996

[22] Filed: May 9, 1979

[30] Foreign Application Priority Data

Jul. 5, 1978 [JP] Japan .................................. 53-80902

[51] Int. Cl.³ .......................... B04B 15/02; B04B 5/06
[52] U.S. Cl. .................................................... 233/15
[58] Field of Search ......................... 233/15, 14 R, 12

[56] References Cited

U.S. PATENT DOCUMENTS

| | | | |
|---|---|---|---|
| 1,887,476 | 11/1932 | Lindgren | 233/15 |
| 3,133,880 | 5/1964 | Madany | 233/15 |
| 3,179,333 | 4/1965 | Claridge | 233/15 |
| 3,221,986 | 12/1965 | Burdett et al. | 233/15 |
| 3,327,939 | 6/1967 | Doyle et al. | 233/15 |
| 3,344,983 | 10/1967 | Podbielniak | 233/15 |
| 3,443,746 | 5/1969 | Halbach | 233/15 |

Primary Examiner—Stanley N. Gilreath
Attorney, Agent, or Firm—Craig and Antonelli

[57] ABSTRACT

A centrifugal type counterflow contact apparatus having a rotary body or drum intergrally mounted on a rotary shaft, and a plurality of ring members disposed within the rotary body such that circumferential slits are defined between the adjacent ring members in the axial direction of the rotary drum. The ring members have a cross sectional configuration inclined with respect to the axis of the rotary body. A light liquid is introduced into the periphery of the rotary body while a heavy liquid is introduced in the center portion of the rotary body. The heavy and light liquids flow countercurrently through the slits between the ring members under the centrifugal force produced by the rotation of the rotary body, whereby extractability can be improved and accumulation of solids entrained in the feed can be avoided.

12 Claims, 10 Drawing Figures

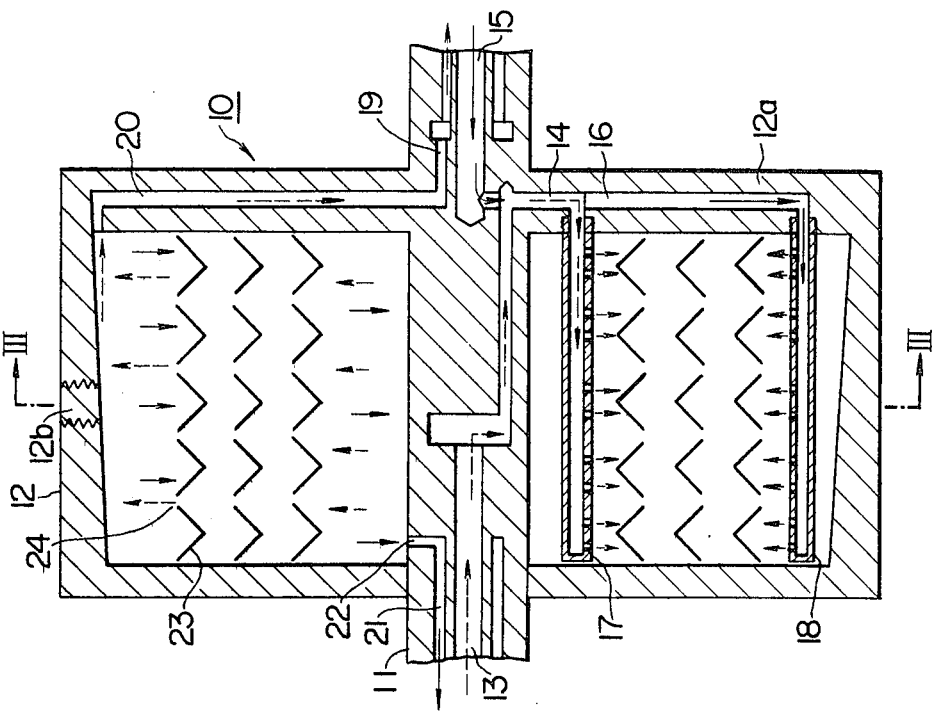
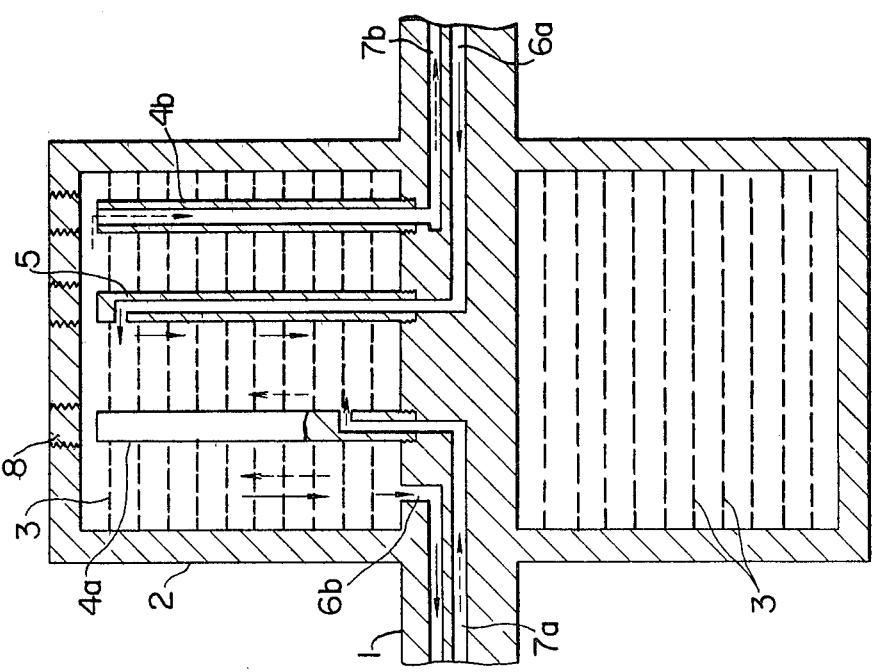

CENTRIFUGAL TYPE COUNTERFLOW CONTACT APPARATUS

BACKGROUND OF THE INVENTION

The present invention relates to a centrifugal type counterflow contact apparatus for use with a centrifugal extractor in which extraction is effected by the counterflow contact of heavy and light liquids insoluble to each other.

The prior centrifugal type counterflow contact apparatus disclosed in Japanese Utility Model Publication No. 12767/1978 and Japanese Patent Publication No. 12564/1961 employs a plurality of perforated cylinders coaxially disposed and spaced from one another within a rotary drum. With such arrangement, a heavy liquid is introduced to the center of the rotary body or drum while a light liquid is introduced about the periphery thereof. The rotation of the rotary body or drum causes the radial counterflow of the heavy and light liquids. That is, the heavy liquid is caused to flow radially outwardly through the pores or small holes in the perforated cylinders while the light liquid is caused to flow radially inwardly through them while making the counterflow contact with the heavy liquid.

The centrifugal type counterflow contact apparatus disclosed in Japanese Patent Publication No. 24283/1967 employs a plurality of perforated rings each having a frustoconical configuration in cross-section and disposed within the rotary body or drum. The wall of each perforated ring is inclined at a small acute angle relative to the horizontal in a plane including the axis of the rotary drum. The walls of adjacent rings alternately diverge and converge toward the one side wall of the rotary drum. With such construction, the heavy and light liquids counterflow contracting each other at areas where adjacent rings are close to each other, and are separated from each other at areas where adjacent rings are spaced away from each other.

In both of the centrifugal type counterflow contact apparatus described above, sludge or solids entrained in the feed are accumulated on the inner or outer surfaces of the perforated rings or cylinders depending upon the specific gravity of the solids, so that extraction efficiency of the apparatus is decreased. The accumulated solids may be washed away from outside by removing rotary plugs on the peripheral wall of the rotary body or drum. However, this cleaning method is difficult to be completely done. Furthermore the nonuniform distribution of the solids still remaining in the rotary body or drum after cleaning frequently causes dynamic imbalance of the rotary body or drum, resulting in a serious accident during operation.

SUMMARY OF THE INVENTION

One of the objects of the present invention is therefore to eliminate the above defects of the prior centrifugal type counterflow contact apparatus.

Another object of the present invention is to provide a centrifugal type counterflow contact apparatus which may eliminate accumulation in a rotary body or drum of solids contained in the feed and which may improve extraction efficiency.

The present invention provides a centrifugal type counterflow contact apparatus having a plurality of ring-shaped members disposed within a rotary body or drum and inclined at an angle with respect to the axis of the rotary body or drum when viewed in cross section lying in a plane including the axis of the rotary body or drum and having circumferential slits between the adjacent ring-shaped members aligned with each other in the direction parallel to the axis of the rotary drum, said slits permitting heavy and light liquids to flow therethrough and counterflow contact each other.

The above and other objects, features and advantages of the present invention will become more apparent from the following description of preferred embodiments thereof taken in conjunction with the accompanying drawings.

BRIEF DESCRIPTION OF THE DRAWINGS

FIG. 1 is a longitudinal sectional view of a prior centrifugal type counterflow contact apparatus;

FIG. 2 is a schematic longitudinal sectional view of a centrifugal type counterflow contact apparatus in accordance with a first embodiment of the present invention;

DESCRIPTION OF THE PREFERRED EMBODIMENT

Figure 3:
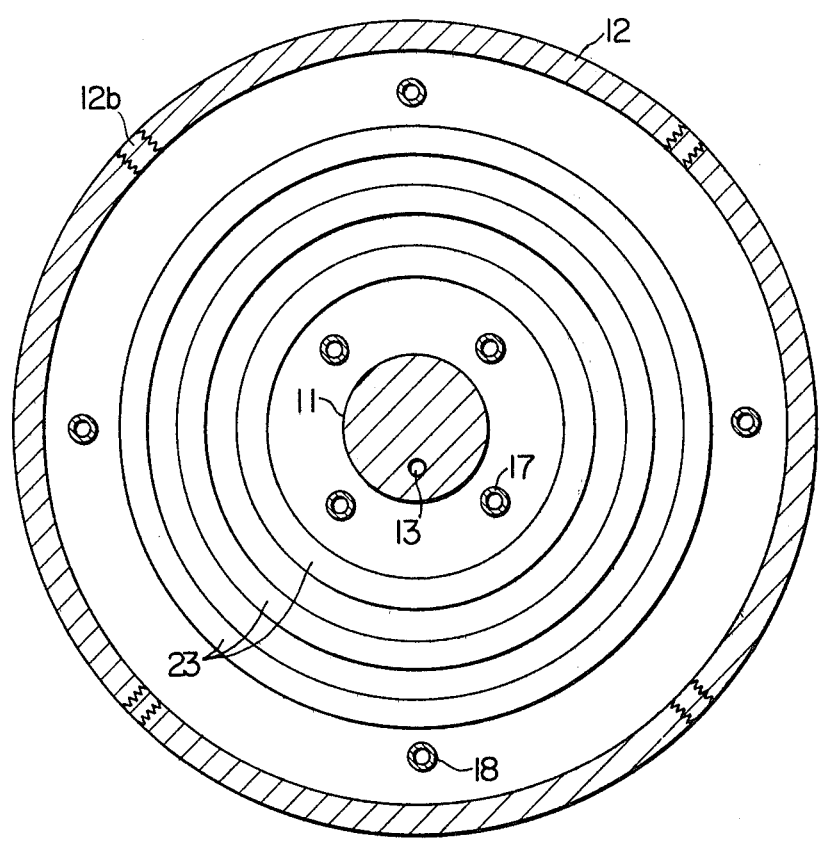
FIG. 3 is a sectional view taken along the line III—III of FIG. 2.

In FIG. 1 there is shown a typical prior art centrifugal type counterflow contact apparatus. A rotary body or drum 2 is mounted on a rotary shaft 1 and accommodates a plurality of perforated cylinders 3 disposed concentrically with the axis of the rotary shaft 1. The rotary shaft 1 mounts thereon a heavy liquid inlet pipe 4a, a light liquid inlet pipe 5 and a heavy liquid outlet pipe 4b. The shaft 1 is also formed with a light liquid outlet passage 6b, a light liquid inlet passage 6a, a heavy liquid outlet passage 7b and a heavy liquid inlet passage 7a all of which are extended through the shaft 1. A heavy liquid is introduced through the heavy liquid inlet passage 7a and pipe 4a into the center portion of the rotary body or drum 2 and flows radially outwardly by the centrifugal force produced by the rotation of the rotary body or drum 2. A light liquid is introduced from the peripheral side through the light liquid inlet passage 6a and pipe 5 into the peripheral portion of the rotary body or drum 2 and flows radially inwardly by the centrifugal force produced by the rotation of the rotary body or drum 2. Within the rotary body or drum 2, the heavy and light liquids are caused to counterflow and contact each other through the pores in the perforated cylinders 3. The heavy liquid is caused to flow toward the periphery of the rotary body or drum 2 and discharge through the heavy liquid outlet pipe 4b and passage 7b to the outside while the light liquid is caused to flow toward the center portion of the rotary body or drum 2 and discharge through the light liquid outlet passage 6b to the outside. When sludge or solids is existing in a process liquid and has a specific gravity greater than that of the heavy liquid, the solids are forced to adhere to the inner wall surfaces of the respective perforated cylinders 3 under the influence of the centrifugal force. On the other hand, when the solids have a specific gravity smaller than that of the light liquid, they are forced to adhere to and accumulate on the outer wall surfaces of the respective perforated cylinders 3. When the solids are thus accumulated in the spaces between the adjacent perforated cylinders 3, rotary plugs 8 are removed so that the interior of the rotary body or drum 2 can be washed. However, it is difficult to wash away the solids accumulated between the respective perforated cylinders 3, and insufficient and localized washing results in imbalance of the rotary body or drum 2 thereby hampering smooth operation of the apparatus. An amount of the solids accumulated between the perforated cylinders 3 can be reduced by increasing the opening ratio of the perforated cylinders 3 through the increases in the diameter of pores or the increase in number of pores and by reducing the rotational speed of the rotary body or drum 2. However, the reduction in rotational speed of the rotary body or drum 2 results in reducing in the centrifugal force while the increase in the opening ratio of the perforated cylinders 3 results in hampering uniform counterflow of the heavy and light liquids. More particularly, the larger the opening ratio of the perforated cylinders 3, the slower the flow velocities of the heavy and light liquids passing through the pores of the perforated cylinders 3 becomes and the less the resistance of the pores to the flows of the heavy and light liquids becomes. Therefore, the flow rates of the heavy and light liquids passing through the pores in the perforated cylinders 3 vary resulting in deflected flows to reduce extraction rate.

In FIGS. 2-8 there is shown a centrifugal type counterflow contact apparatus generally designated by reference numeral 10 10 in accordance with the present invention. In the drawings, a rotary body or drum 12 is mounted on a rotary shaft 11 to be rotated therewith. A heavy liquid inlet passage 13 is formed in the rotary shaft 11 and is connected to a passage 14 formed in a side wall 12a of the rotary body or drum 12. A light liquid inlet passage 15 is formed in the rotary shaft 11 and is connected to a passage 16 formed in the side wall 12a of the rotary body or drum 12. Heavy and light liquid inlet pipes 17 and 18 are attached to the side wall 12a of the rotary body or drum 12 such that they communicate with the passages 14 and 16. In this way, the heavy liquid is introduced through the heavy liquid inlet passage 13, passage 14 and heavy liquid discharge pipe 17 into the center portion of the rotary body or drum 12. The light liquid is introduced through the light liquid inlet passage 15, passage 16 and liquid discharge pipe 18 into the periphery of the rotary body or drum 2. A heavy liquid outlet passage 19 is formed in the rotary shaft 11 and is connected to a passage 20 formed in the side wall 12a of the rotary body or drum 12. The heavy liquid is discharged from the periphery of the rotary body or drum 12 through the passage 20 and heavy liquid outlet passage 19 to the outside. Light liquid outlet passage 21 and passage 22 are formed in the rotary shaft 11 to pass the light liquid therethrough to the outside. A plurality of V-shaped rings are provided in the rotary body or drum 2 coaxially of the axis of the rotary shaft 11. There are provided slits 24 between the adjacent V-shaped rings 23 and between the V-shaped rings 23 and the side walls 12a of the rotary body or drum 12, and a plurality of small holes 25 are formed at the bottom of the respective V-shaped ring 23 so as to drain the liquids.

Figure 6:
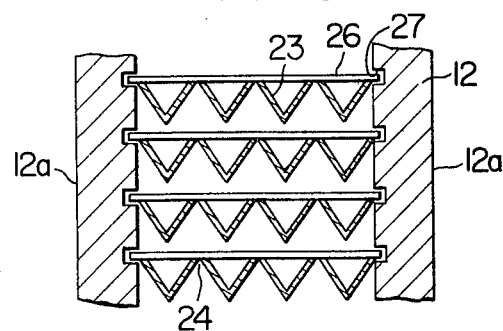
Figure 7:
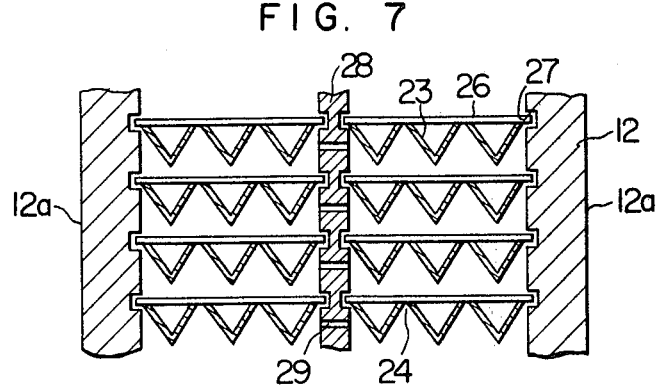

In FIGS. 6 and 7 there are shown the manner of mounting the V-shaped rings 23 within the rotary body or drum 12. A plurality of V-shaped rings 23 having the same diameter are securely joined by welding or the like to a plurality of axially extending support members 26 at several points in the circumferential direction. Both ends of each of the support members 26 are fitted into recesses 27 formed in the inner surfaces of the side walls 12a of the rotary body or drum 12 to hold the V-shaped rings 23 in position. When the width or the axial length of the rotary body or drum 12 is large, a partition wall 28 is mounted on the rotary shaft 11 at right angles thereto, as shown in FIG. 7. The support members 26 are supported by the partition wall 28 and the side walls 12a, so that the axial deflection of the V-shaped rings 23 can be avoided. Equalizing holes 29 are formed in the partition wall 28 to equalize the pressures on both sides of the partition wall 28. With this construction, the heavy liquid is introduced through the heavy liquid inlet passage 13, passage 14 and heavy liquid inlet pipe 17 into the center portion of the rotary body or drum 12. The light liquid is introduced through the light liquid inlet passage 15, passage 16 and light liquid inlet pipe 18 into the periphery of the rotary body or drum 2. The centrifugal force produced by the high speed rotation of the rotary body or drum 12 causes the counterflow contact of the heavy and light liquids through the slits 24. The heavy liquid is forced to flow toward the periphery of the rotary body or drum 12 and is discharged through the passage 20 and heavy liquid outlet passage 19. The light liquid is forced to flow toward the center portion of the drum 12 and is discharged through the passage 22 and light liquid outlet passage 21 to the outside.

The counterflow contact of the heavy and light liquids will be described in more detail with reference to FIG. 4. Within the rotary body or drum 12, there exist a continuous phase of heavy liquid 30 near the periphery of the rotary body or drum and a continuous phase 31 of light liquid near the center portion of the rotary body or drum 12. The main interfacial surface 23 exists between them. In the continuous phase 31 of light liquid the heavy liquid droplets flows radially outwardly toward the periphery of the rotary body or drum 12. More particularly, the heavy liquid droplets impinge against and flow along the inclined surfaces of the V-shaped rings 23 to be combined or deformed, and then reach the main interfacial surface 32 while being dispersed through the slits 24. Once the heavy liquid is combined with the continuous phase of heavy liquid 30, the liquid will not be dispersed into fine droplets and is caused to flow radially outwardly through the slits 24 between the V-shaped rings 23. In the continuous phase 30 of heavy liquid the light liquid droplets are collected in weirs 23a defined by the V-shaped rings 23 and overflow over the weirs to flow radially inwardly through the weirs 24 while being in the form of fine droplets. These fine droplets of light liquid make counterflow contact with the heavy liquid which flows radially outwardly through the slits 24, and reach the main interfacial surface 32 to be combined with the continuous phase 31 of light liquid, thereby flowing radially inwardly toward the center portion of the rotary body or drum 12.

As described above, both heavy and light liquids are subjected to counterflow contact due to alternate dispersion and confluence while flowing radially outwardly and inwardly through the slits 24 difined between the V-shaped rings 23 and between the rings 23 and the side walls 12a of the rotary body or drum 12. As a consequence, the extraction efficiency can be remarkably improved.

Figure 4:
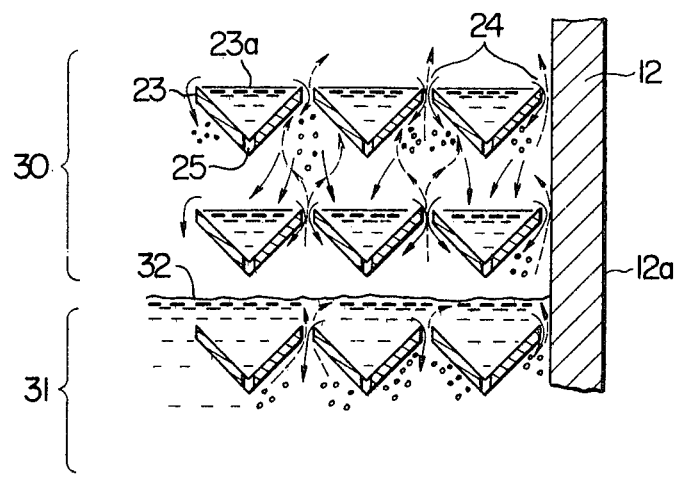
FIGS. 4–7 are partially exploded sectional views of the apparatus shown in FIG. 2.

When a process liquid contains solids having a specific gravity larger than that of the heavy liquid, the inclined side walls of each V-shaped ring 23 are diverged radially outwardly, as best shown in FIGS. 2 and 4, so that the solids can be guided along the inclined surfaces of the V-shaped rings 23 to pass through the slits 24. Thus the smooth radial outward flows of solids can be ensured. On the other hand, when the solids are smaller in specific gravity than that of the light liquid, the side walls of the V-shaped rings 23 are diverged radially inwardly contrary to that shown in FIGS. 2 and 4 so that the solids can smoothly move radially inwardly. In both cases, therefore, solids are prevented from being accumulated in the rotary body of drum 12.

The inventors made an experiment on the separation of a water-kerosene system containing finely divided powder of calcium carbonate as solids by using the centrifugal type counterflow contact apparatus provided with V-shaped rings 23 of 100° of vertical angle in the rotary drum 12. It was confirmed that no adhesion or accumulation of the solids on the surfaces of the V-shaped rings 23 occured.

Figure 5:
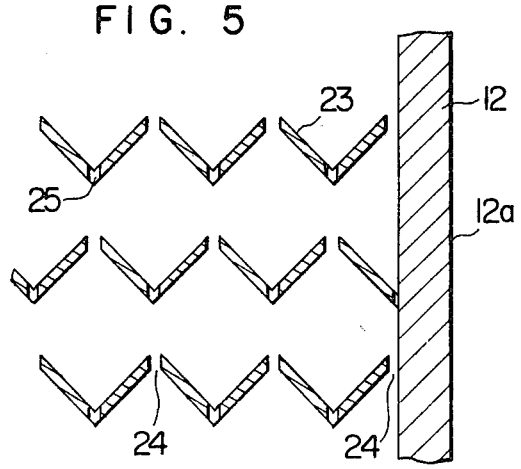

It is not required that the respective V-shaped rings 23 in one stage be radially aligned with those in other stages, but as shown in FIG. 5 the V-shaped rings 23 may be displaced from one another in the axial direction so that the slits 24 are staggered axially from one another. With the staggered V-shaped rings 23, the process liquid more frequently impinges against the inclined surfaces, of the V-shaped rings 23 to flow in a zigzag direction thus being necessarily subjected to dispersion and confluence. Thus the extraction efficiency can be further improved.

Another advantage of the present invention resides in the fact that the small holes 25 formed at the bottoms of the weirs 23a defined by the V-shaped rings 23 serve to renew the light liquid trapped in the weir 23a.

Figure 8:
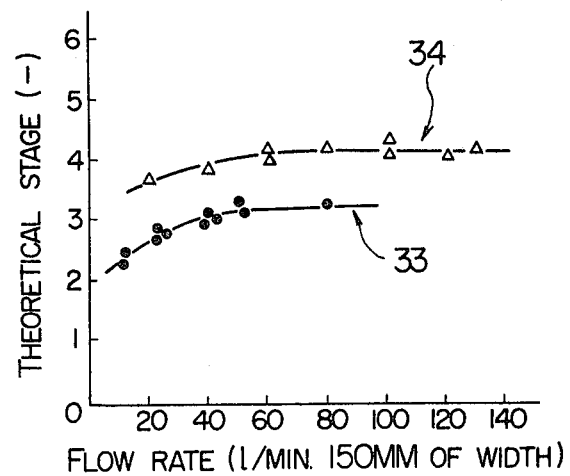
FIG. 8 is a graph showing the comparison in extraction efficiency between the centrifugal type counterflow contact apparatus in accordance with the present invention and the prior art apparatus with a corresponding capacity.

FIG. 8 shows the comparison in the extraction efficiency between the centrifugal type counterflow contact apparatus in accordance with the present invention and the prior art. The comparison test were made with the apparatus with a drum of an inner diameter of 1,000 mm and of an inside width of 150 mm. And the apparatus of the present invention was constructed as shown in FIG. 5. The tertiary system used was water n-butyl-amine-kerosene system. N-butyl-amine as a solute was extracted from the kerosene phase into the water phase in the apparatus.

The extraction efficiency was obtained in terms of theoretical stage; that is, the relation between the flow rate of feed and the extractability theoretical stage. The theoretical stage was obtained by the following formula:

$$n_{TS} = \log\left(1 + \frac{(x_1 - x_2)(a - m)}{mx_1 - y_1}\right) / \log\frac{a}{m}$$

$$a \cdot \frac{y_1 - y_2}{x_1 - x_2} \cdot \frac{Q_x}{Q_y}$$

where
 $n_{TS}$: theoretical stage;
 $x_1$: concentration of solute in the feed;
 $x_2$: concentration of solute in raffinate;
 $y_1$: concentration of solute in extraction phase;
 $y_2$: concentration of solute in extracting solvent;
 $m$: distribution coefficient;
 $Q_x$: flowrate of feed;
 $Q_y$: flow rate of extracting solvent.

The rotational speed was 1,900 rpm, and the ratio of flow rate between water and kerosene was 1/1 by volume.

Under the same conditions as described above, test was conducted with the prior art apparatus. In FIG. 8, curve 33 shows the extractability of the prior art apparatus while curve 34 shows that of the apparatus of the present invention which has the construction as shown in FIG. 5.

As seen from FIG. 8, both the present apparatus and the prior art apparatus exhibit similar tendency in extractability, but it is to be noted that the extractability of the present invention is higher by about 30% than that of the prior art.

Figure 9:
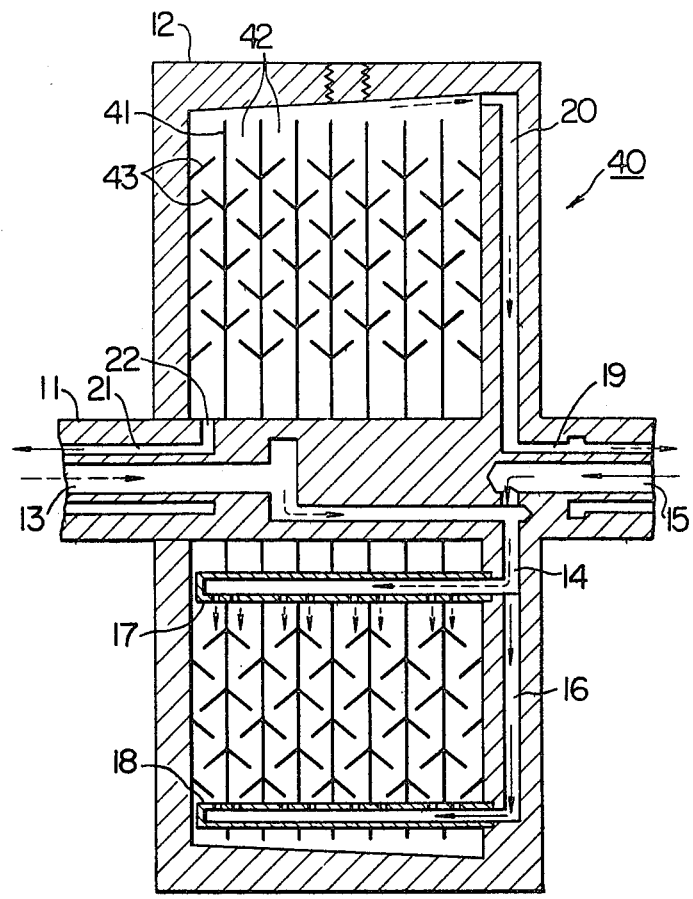
FIG. 9 is a schematic longitudinal sectional view of a centrifugal type counterflow contact apparatus in accordance with a second embodiment of the present invention.
Figure 10:
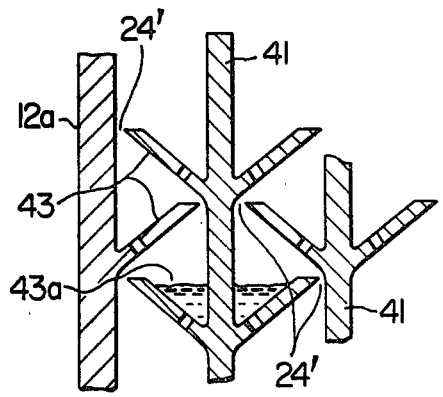
FIG. 10 is a fragmentary sectional view of the apparatus of FIG. 9 on enlarged scale.

In FIGS. 9 and 10, there is shown another embodiment of a centrifugal type counterflow contact apparatus generally designated by reference numeral 40 in accordance with the present invention. In the drawing, similar parts to those in FIG. 2 are designated by same reference numerals. A plurality of partition disks 41 are secured to the rotary shaft 11 in perpendicular relation therewith to divide the interior of the rotary body or drum 12 into a plurality of compartments 42. A plurality of rings 43 having a frustoconical cross section are attached to the inner surfaces of the side walls 12a of the rotary body or drum 12 and to the opposite faces of the respective partition disks 41; The rings 43 on the respective partition disks 41 are disposed in staggered relation with those on the adjacent partition disks 41 or on the side walls 12a of the rotary body or drum 12. The rings 43 are extended in such a way that their peripheral edges define annular slits 24' between them and the adjacent partition disks 41 or the side walls 12a of the rotary body or drum 12.

In operation, heavy liquid is introduced through the heavy liquid inlet pipe 17 into the respective compartments 42 near the center portion of the rotary body or drum 12, and light liquid is introduced through the light liquid inlet pipe 18 into the respective compartments 42 near the periphery of the rotary body or drum 12. The heavy liquid flows radially outwardly in a zigzag fashion along the inclined surfaces of the rings 43 in the respective compartments 42 while passing through the slits 24', and reaches the periphery of the rotary body or drum 12 to be discharged through the passage 20 and heavy liquid outlet passage 19 to the outside. Also, the light liquid flows radially inwardly in a zigzag fashion along the inclined surfaces of the rings 43 in the respective compartments 42 while passing through the slits 24', and counterflow-contacts the heavy liquid flowing radially inwardly to reach the center portion of the rotary body or drum 12, thereby discharging through the passage 22 and light liquid outlet passage 21 to the outside.

As is the case of the first embodiment of FIG. 4, a main interfacial surface is generated, and the light liquid is dispersed in the heavy liquid at the area radially outwardly of the main interfacial surface. The light liquid is collected in weirs 43a defined between the rings 43 and the side walls 12a or partition disks 41 to be positively combined together. The light liquid overflows the weirs 43a and is dispersed again in the form of fine droplets during the passage through the slits 24'.

In like manner, the heavy liquid is dispersed at the area radially inwardly of the main interfacial surface and impinges against the inclined surfaces of the rings 43 to flow radially outwardly in a zigzag through the slits 24' while the light liquid flows radially inwardly in a continuous phase.

As the flow paths of the heavy and light liquids are zigzag in the radial direction within the respective compartments 42, the both liquids can be mixed with each other in the axial direction. Furthermore, the flow passages of the liquids alternately converge or diverge in the radial direction, so that extractability can be further improved as described above, and accumulation of solids is eliminated.

What is claimed is:

1. A centrifugal type counterflow contact apparatus comprising a rotary body integrally mounted on a rotary shaft, means for introducing a light liquid into said rotary body about the periphery thereof, means for introducing a heavy liquid about the center portion of the rotary body, means for discharging said heavy liquid from the periphery of said rotary body, means for discharging said light liquid from a center portion of said rotary body, and means for causing a counterflow contacting of the light and heavy liquids comprising:

a plurality of V-shaped ring members disposed within said rotary body and being spaced from one another axially of the rotary body so as to define slits between respective adjacent ring members, each of said ring members having a V-shaped cross sectional configuration which opens radially outwardly with respect to said rotary shaft.

2. A centrifugal type counterflow contact apparatus as set forth in claim 1, wherein said ring members are provided in stages coaxially of the axis of said rotary body.

3. A centrifugal type counterflow contact apparatus as set forth in claim 2, wherein said ring members are provided in rows in the axial direction of the rotary body.

4. A centrifugal type counterflow contact apparatus as set forth in claim 3, wherein the slits between the adjacent ring members in the respective stages are aligned at right angles to the axis of said rotary body.

5. A centrifugal type counterflow contact apparatus as set forth in claim 3, wherein the slits defined between the adjacent ring members in each stage are staggered with respect to those in the adjacent stages.

6. A centrifugal type counterflow contact apparatus as set forth in claim 3, wherein the adjacent ring members in each stage are disposed to define convergent flow passages in the flow direction of solids.

7. A centrifugal type counterflow contact apparatus as set forth in claim 1, wherein liquid drain holes are formed at the crests of V-shaped cross section of said ring members.

8. A centrifugal type counterflow contact apparatus as set forth in claim 1 further comprising a plurality of partition disks provided within said rotary body and defining a plurality of compartments separated from one another in the axial direction of said rotary body, said each ring member having its connection to said partition disk secured such that there are provided gaps disposed axially between the adjacent partition disks, and said ring members on one partition disk are disposed radially in zigzag relation to the ring members mounted on the adjacent partition disks axially of the rotary body so as to define slits between respective adjacent ring members, each of said ring members having a V-shaped cross sectional configuration which opens radially outwardly with respect to said rotary shaft.

9. In a centrifugal type counterflow contact apparatus including a rotary body integrally mounted on a rotary shaft, and inlet and outlet passages provided in the rotary shaft for light and heavy liquids, respectively, and adapted for introducing the light liquid into said rotary body about the periphery thereof, introducing the heavy liquid about the center portion of the rotary body, and removing the heavy liquid from the periphery of the rotary body and the light liquid from the center portion of the rotary body after counterflow contact of the light and heavy liquids within the rotary body, the improvement comprising a plurality of plates in the form of frusto-conical surfaces with the rotation axis of the rotary body being coaxial with the axes of the frusto-conical surfaces, said respective plates in pair making members with one of said respective pair of plates in the form of a frusto-conical surface being symmetrical about a radial surface of the rotary body with the other of said respective pair of plates in the form of a frusto-conical surface, said respective members being disposed relative to one another with gaps therebetween in the axial and radial directions of the rotary body.

10. A centrifugal type counterflow contact apparatus as set forth in claim 9, wherein said respective pair of plates in the form of frusto-conical surfaces are connected to each other at smaller diameter peripheral edges of the pair of plates, and define gaps between the same and the adjacent pairs of plates at larger diameter peripheral edges of the pair of plates.

11. A centrifugal type counterflow contact apparatus as set forth in claim 9, wherein said respective pair of plates in the form of frusto-conical surfaces are connected to each other at larger diameter peripheral edges thereof, and define gaps between the same and the adjacent pairs of plates at larger diameter peripheral edges of the pair of plates.

12. A centrifugal type counterflow contact apparatus as set forth in claim 9, further comprising partitions extending perpendicular to the rotational axis of the rotary body for defining compartments aligned in the axial direction of the rotary body, said partitions being joined to one of said smaller and larger diameter peripheral edges of said plates in the form of frusto-conical surfaces.

* * * * *